United States Patent
Discenzo et al.

(10) Patent No.: US 7,949,483 B2
(45) Date of Patent: May 24, 2011

(54) INTEGRATION OF INTELLIGENT MOTOR WITH POWER MANAGEMENT DEVICE

(75) Inventors: Frederick Michael Discenzo, Brecksville, OH (US); Richard Kirkpatrick, Greenville, SC (US); Michael Offik, Greer, SC (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 851 days.

(21) Appl. No.: 11/241,727

(22) Filed: Sep. 30, 2005

(65) Prior Publication Data

US 2007/0078614 A1 Apr. 5, 2007

(51) Int. Cl.
*G01R 21/00* (2006.01)
*G08B 21/00* (2006.01)
(52) U.S. Cl. .......................................... 702/60; 340/648
(58) Field of Classification Search ................... 702/60, 702/57, 62, 182, 183, 188, 33–36, 41, 44, 702/58, 64–67, 75, 81, 84, 85, 105, 127, 702/184; 340/870.01, 648, 870.1; 318/439, 318/441, 450, 440, 491, 538; 310/68 B, 310/68 C, 68 R; 700/17, 26, 110, 286, 287, 700/293, 297
See application file for complete search history.

(56) References Cited

U.S. PATENT DOCUMENTS

| | | | |
|---|---|---|---|
| 4,581,711 A * | 4/1986 | Hirata et al. | 702/64 |
| 4,817,045 A * | 3/1989 | Faeser | 700/293 |
| 5,754,450 A * | 5/1998 | Solomon et al. | 702/35 |
| 5,917,428 A | 6/1999 | Discenzo et al. | |
| 5,995,910 A | 11/1999 | Discenzo | |
| 6,041,287 A | 3/2000 | Dister et al. | |
| 6,289,735 B1 | 9/2001 | Dister et al. | |
| 6,295,510 B1 | 9/2001 | Discenzo | |
| 6,321,602 B1 * | 11/2001 | Ben-Romdhane | 73/660 |
| 6,326,758 B1 * | 12/2001 | Discenzo | 318/609 |
| 6,434,512 B1 | 8/2002 | Discenzo | |
| 6,529,135 B1 * | 3/2003 | Bowers et al. | 340/648 |
| 6,646,397 B1 | 11/2003 | Discenzo | |
| 6,655,922 B1 | 12/2003 | Flek | |
| 6,663,349 B1 | 12/2003 | Discenzo et al. | |
| 6,757,665 B1 | 6/2004 | Unsworth et al. | |
| 6,839,660 B2 * | 1/2005 | Eryurek et al. | 702/188 |
| 6,847,854 B2 | 1/2005 | Discenzo | |
| 2003/0187554 A1 * | 10/2003 | Henry et al. | 701/29 |
| 2006/0025970 A1 * | 2/2006 | Wegerich | 702/189 |

OTHER PUBLICATIONS

Discenzo et al., Intelligent Motors—Using Motors for Asset management from a Remote Location, 1999 IEEE, pp. 319-326.*
Blair et al., Integrating Networks into Motor Control Systems, 2001 IEEE, pp. 225-232.*

(Continued)

*Primary Examiner* — Mohamed Charioui
*Assistant Examiner* — Toan M Le
(74) *Attorney, Agent, or Firm* — Schwegman Lundberg et al; William R. Walbrun; John M. Miller

(57) ABSTRACT

A method and apparatus provide for reduced cost and complexity in managing an intelligent motor in an architecture in which information is transferred between a power management device and the intelligent motor. The information may be used by an embedded processor of the motor to provide diagnostics and/or prognostics of the motor, machinery operating in conjunction with the motor, and/or a process in which the motor may be configured to operate. The power management device may remotely determine motor current information that is used by the intelligent motor to self-diagnose the intelligent motor using the motor current information.

66 Claims, 1 Drawing Sheet

OTHER PUBLICATIONS

Wade et al., Reduced Cable Smart Motors Communicating over the DC Power Bus-Line for High Degree of Freedom Systems, Oct. 2003, Proceedings of the 2003 IEEE/RSJ, International Conference on Intelligent Robots and Systems, pp. 1987-1991.*

Blair et al., Networked Intelligent Motor-Control Systems, 2001 IEEE, pp. 18-25.*

Takahashi, T., Intelligent Power-Management Peripheral for Motor Control, Nov. 21, 2000, 8 pp.*

Discenzo et al., Intelligent Motor Provides Enhanced Diagnostics and Control for Next Generation Manufacturing Systems, Oct. 2000, Computing & Control Engineering Journal, pp. 228-233.*

* cited by examiner

INTEGRATION OF INTELLIGENT MOTOR WITH POWER MANAGEMENT DEVICE

FIELD OF THE INVENTION

The present invention relates generally to motors, motor diagnostics, and motor control.

BACKGROUND

Monitoring rotating machinery, for example an AC (alternating current) induction motor, is typically conducted by measuring vibration, current, and/or voltages with sensors attached to the machine and analyzed by a separate processor with analog-to-digital (A/D) converters, signal processing, algorithms, and a communications interface. For motor control or motor protection devices, current sensors are typically embedded in existing power management devices such as a variable speed drive or a motor soft-start device. Alternatively, clamp-on probes may be used for short term monitoring of motor current such as to support diagnostics of the motor windings. A separate sensor box with current sensors may be used to sample motor current. In such cases, sampled current data may be used to diagnose the motor in an apparatus or system separate or remote from the motor. Sampled motor current may be analyzed to also detect faults or process problems with equipment connected to the motor such as a motor-operated valve, motor-driven pump, or gearbox driven by a motor. Techniques and apparatus are needed to reduce the complexity and cost associated with motor monitoring as needed to support the diagnostics and prognostics of a motor.

SUMMARY

The above mentioned problems are addressed by embodiments of the present invention and will be understood by reading and studying the following specification. In an embodiment, information is transferred between a power management device and a motor, where the motor has an embedded processor to provide diagnostics and/or prognostics using the information, and the power management device may be configured to generate the information.

These and other aspects, embodiments, advantages, and features will become apparent from the following description and the referenced drawings.

DETAILED DESCRIPTION

Figure 1:
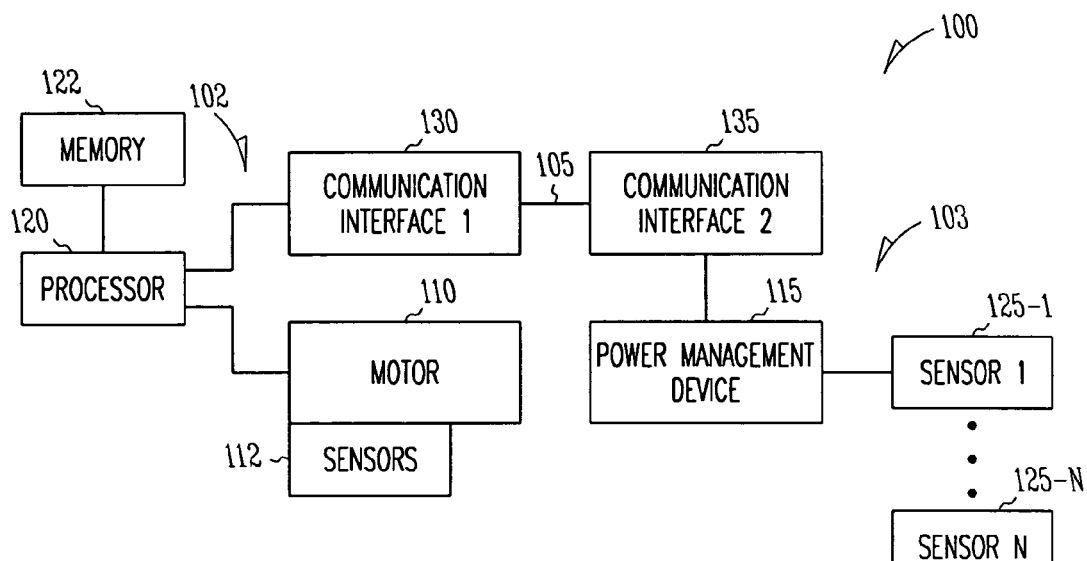
FIG. 1 illustrates a block diagram of an embodiment of an architecture in which a motor having a processor and software algorithms in local memory to self-diagnose the motor may receive information regarding its motor current from a power management device that determines the motor current remotely from the motor.

In the following detailed description of the invention, reference is made to the accompanying drawings which form a part hereof, and in which are shown by way of illustration, specific embodiments in which the invention may be practiced. These embodiments are described in sufficient detail to enable those skilled in the art to practice the present invention. Other embodiments may be utilized and structural, logical, and electrical changes may be made without departing from the scope of the invention. The various embodiments disclosed herein are not necessarily mutually exclusive, as some embodiments can be combined with one or more other embodiments to form new embodiments. The following detailed description is, therefore, not to be taken in a limiting sense.

In an embodiment, a communications interface may transfer motor current information between a motor and a power management device, where the motor has a processor to self-diagnose the motor and the power management device has at least one sensor to remotely determine the motor current of the motor. Motor current information sent to such a motor may include, but is not limited to, raw motor current data and/or an analysis of its motor current. In an embodiment, a power management device may sample all three phases of motor current and three phases of voltage. These multiple channel samplings by the power management device may be conducted simultaneously on each channel. Raw, sampled current and voltage information may be sent to the motor through the communications interface. Alternatively, root mean square (RMS) current and voltage or frequency information, for example information from performing a Fast Fourier Transform (FFT), or suitable parameters extracted from the motor current and voltage, or coefficients, such as wavelet coefficients or joint time-frequency information may be computed at the power management device and sent to the motor through the communications interface. The power management device may alter or process the motor current information using one or more signal processing techniques such as filtering, smoothing, translation to frequency domain, conversion to wavelet coefficients, curve fitting, or other techniques to enhance the generation of information related to motor current.

In an embodiment, the motor may compute algorithms under control of its processor to self-diagnose its health, where the algorithms use the motor current information received from the power management device. In addition or alternatively, the motor may use the motor current information to diagnose the health of equipment connected to the motor such as a gearbox, fan, motor-operated valve or pump. Also, the motor may use the motor current information to diagnose the condition of the process associated with motor operation such as detecting two-phase flow or fluid cavitation in a pumping process. The motor current information may be provided in real-time from the power management device to the remote motor for implementation of embedded diagnostics in the motor. In an embodiment, a power management device and a motor having a processor for self-diagnosis may perform partial diagnosis and exchange information to implement enhanced diagnosis at the motor and/or at the power management device. Such a motor and power management device may collaborate with each other or other components in a system to generate a more accurate diagnosis or prognosis of a motor related apparatus or to generate a more accurate system-level diagnosis and/or prognosis.

A basic motor typically includes iron and copper and electrical wires to turn a shaft of the motor. In an embodiment, a motor includes a processor integral to the motor. When power is connected to such a motor, the power is also connected to one or more circuit boards grouped together inside an electrical connection box on the motor. By connecting the power to the motor to the windings, the power may be routed through some transformers to pull a small amount of power from the motor power to the electrical connection box that may contain a processor and sensors or terminations of sensors embedded in the motor. The processor may be a microprocessor. The sensors may be used to sense various parameters including, but not limited to, from one to three phases of current, one to three phases of voltage, one to five axis of vibration with accelerometers that are imbedded inside the motor, one to three proximity probes to monitor shaft displacement in two radial directions and an axial direction, motor speed such as through an encoder, motor location such as through a GPS sensor, air gap field strength, changes in magnetic field strength at one or more locations around the motor winding, motor winding temperature at one or more locations, and the temperature of the motor bearings. The motor bearings sensed may include the bearing at the load end of the motor (i.e. the motor shaft end connected to driven equipment) and/or the bearing at the opposite end (e.g. the fan end) of the motor shaft. The parameters measured by these sensors may be input to the processor that is configured as an integral part of the motor.

The processor may continually sample the data provided by the motor sensors and may compute one or more parameters that indicate the operating condition of the motor, connected equipment or the process in which the motor is connected. The sampled data may be used to determine the health of the motor, process equipment, or process operation. The processor using memory storage within the motor may also execute instructions to process a motor model to compute motor parameters that may determine whether the motor is operating properly and determine if there may be some fault that may be beginning to appear. The embedded motor model may be based on motor design parameters and, optionally, actual motor test data at the time of motor manufacture. This "birth certificate" information resides in computer memory for the life of the motor. Observed motor operation may be compared to the motor model-predicted condition and used to determine if the motor is aging properly or if there is unusual degradation, aging, or a fault in any of the motor components. One technique may include computing the difference between computed model motor operating conditions and observed motor operating conditions. The residual between model operation and actual operation may be used to detect a motor fault, process fault, or sensor fault. The status of the motor's own health information may be provided through a network link to a host computer, programmable logic controller (PLC), a computerized maintenance management system (CMMS) and/or by actuating one or more lights on the motor. Herein, a motor having a processor that may provide for self-diagnosis of the motor is called an intelligent motor. Discussions of an intelligent based apparatus are provided in U.S. Pat. Nos. 6,847,854, 6,655,922, 6,757,665, 6,663,349, 6,646,397, 6,434,512, 6,326,758, 6,295,510, 6,289,735, 6,041,287, 5,995,910, 5,917,428, each of which is incorporated herein by reference.

An intelligent motor may include a number of sensors to monitor the condition and status of various portions of the motor (e.g. windings, bearings, rotor, shaft integrity, mounting, unbalance . . . ) and determine the health of the motor without sending information to a system external to the motor for such determination. An intelligent motor may be self-contained with sensors, algorithms, and processor to provide the intelligence for self-diagnosis. For example, a five horsepower intelligent motor may be readily packaged inside a small electrical connection box mounted on a motor and contain a processor, memory, power conversion, network interface, three currents sensors, three voltage input devices, three temperature inputs, a vibration input, and encoder input and operate as a self-contained box on the motor.

For large horsepower motors, current sensors may be relatively large and relatively expensive to configure in an intelligent motor. For example, intelligent motors having 30 or 50 horsepower or more with large amperage may need larger current sensors to sense the amount of current going to the motor than smaller horsepower motors. The size of all the other components may essentially be unchanged when operating with higher horsepower motors. In addition to increased physical size, increased weight, additional power requirements, and mounting requirements for the larger current sensors, these current sensors may be significantly more expensive. There may also be a requirement for separate power supply to provide power to the larger current sensors. The larger current sensors, additional power supplies, and mounting requirements result in a significantly larger and more costly intelligent motor for larger horsepower motors. In an embodiment, an intelligent motor may be adapted to have motor current information provided to the intelligent motor from a remote device or system such that the intelligent motor may be configured without any embedded motor current sensor and/or embedded current transformers. Such an intelligent motor may perform self-diagnosis using the value of its motor current, or other information related to its motor current, that is measured and provided externally from the intelligent motor.

FIG. 1 illustrates a block diagram of an embodiment of an architecture 100 having systems 102, 103, in which a motor 110, having a processor 120 to self-diagnose motor 110, may receive information regarding its motor current from a power management device 115. Motor power management device 115 may determine the motor current remotely from the motor. Motor 110 having processor 120 may be an intelligent motor configured as system 102. Intelligent motor 102 may include sensors 112 to monitor the condition and status of various portions of the motor, for example, windings, bearings, rotor, shaft integrity, mounting, motor unbalance, and determine the health of the motor without sending information to a system external to the motor for such determination. Herein, a power management device is an apparatus that samples an operating feature of an associated apparatus to determine values of the operating feature, power, and/or energy of the associated apparatus. A power management device may also be configured as a remote standalone unit with current sensors and a processor to send information to an intelligent motor. Power management device 115 may generally already have current sensors and determine motor current information in order to carry out the prime function(s) of the power management devices such as providing speed control for a motor (e.g. VFD) or providing a smooth start-up and shut-down of a motor (e.g. motor soft-start). In an embodiment, a power management device may sample motor current in order to control motor speed, monitor current usage, and/or prevent excessive current usage. A power management device may include processing circuitry such as a processor, a memory, and associated algorithms to provide control and analysis functions. A power management device is separate from its associated apparatus. Power management device 115 may be separated from intelligent motor 102 by a short distance, such as a few feet, or by a significantly larger distance depending on the application. For example, the power management device may be in a controlled environment such as an office area or a motor control center while the motor may be exposed to the air, in a hazardous or explosive environment.

In architecture 100, power management device 115 may determine motor current information for motor 110 and may send this information to motor 110. System 102 may include a communications interface 130 to receive the motor current information and may include memory 122 to store the received motor current information. In an embodiment, system 102 may be configured as an integrated unit. System 102 may be an individual intelligent motor 102. System 103 may include one or more sensors 125-1 . . . 125-N to determine the motor current for one to three phases of motor 110 and optionally one to three phases of voltage of motor 110. System 103 may include a communications interface 135 to transmit motor current information to motor communications interface 130 and to motor processor 120. In an embodiment, system 103 may be configured as an integrated unit. System 103 may be an individual power management device. A communication medium 105 may couple communications interface 130 to communications interface 135. Communications interface 130 and 135 operating over communications link 105 may be of a standard communications link such as direct wired RS232C data link. Communications link 105 may be a network such as DeviceNet, ControlNet, Ethernet, and may operate over direct wired communications links such as copper wire or may operate wirelessly such as using wireless Ethernet (e.g. IEEE 802.11b), wireless Bluetooth, or other wireless links such as IEEE 802.15.4 and, optionally, with Zigbee. Communications may be conducted without a separate communications wire or communications radio but rather using powerline communications. Techniques such as X10 may be adapted to motor powerline communications.

Status information regarding motor 110 may be transmitted over bidirectional medium 105. Motor 110 and its associated processor 120 and communications interface 130 may be part of system 102 that includes other apparatus. Power management device 115 and its associated sensors 125-1, . . . , 125-N and communication device 135 may be part of system 103 that includes other apparatus. System 102 and system 103 may be part of a larger system or plant. In an embodiment, architecture 100 provides an operating platform that this is based on an intelligent motor.

In a motor control room or area, there may include some motor operating equipment such as equipment to stop and start a motor smoothly or to control the motor speed. These motor controllers are separate from the motor, but may be coupled to the motor by wire leads or other communication and/or control paths. Such motor controllers typically have current sensors. These current sensors provide needed information to allow the motor controllers to change the voltage, frequency, or the current to the motor. A conventional motor controller includes sensors or other means to determine the motor current information of the motor that it controls. In an embodiment, a power management device may include three current sensors, three voltage inputs, power switching components, a motor controller processor, memory storage, algorithms, and a communications interface to provide motor control information to an intelligent motor to which it is associated. The motor controller may include a processor, or other electronic controller to manage motor power and also to process and/or format the current motor information, which it captured, to be transmitted to an intelligent motor. The motor controller may also include memory associated with sending motor current information to the intelligent motor. Firmware in a power management device may be provided to send real-time motor current data out through a communication port. A variable speed drive (VSD) may be adapted as power management device 115. The variable speed drive may include motor current information from one to three current sensors that indicate the current utilization for the remote motor with which it is operating. With a communications interface, the variable speed drive may provide an intelligent motor with data regarding the motor's current that is determined remotely from the intelligent motor. Since the variable speed drive captures motor current data, an intelligent motor, operating with the variable speed drive adapted with a communications interface, need not have individual integrated current sensors.

In various embodiments, power management device 115 may include motor-associated apparatus adapted with a communications interface to send motor current information to the motor with which it is operating. Power management device 115 may include, but is not limited to, a variable speed drive (VSD), a variable frequency drives (VFD), a motor soft start such as a smart motor controller (SMC), a power monitoring device, and a smart motor protector (SMP), in which each of these apparatus are able to sample motor current and are adapted to communicate motor current information to a motor having a processor to self-diagnose the motor. Power management device 115 may include current sensors and processor to sent motor current information to intelligent motor 102, where the current sensor and associated sensors are configured as a remote standalone apparatus. Power management device 115 may be configured as a power monitoring device, a power recording device, or a motor current data acquisition module, or configured to include one or more of these devices. The power management device may encode or compress sampled sensor data such as three phases of motor current prior to sending the sampled data to the motor to support motor-based embedded diagnostics. Data compression algorithms, such as those commonly known, may be used. Alternatively, wavelet coefficients may be computed and only the coefficients may be transmitted to the motor. The motor diagnostic algorithms may reconstruct the original data values or data patterns using the received wavelet coefficients.

Variable frequency drives may continually monitor motor current or current and voltage to a motor to adjust the power to the motor. Such VFDs typically include a processor, such as a microprocessor, to control monitoring of and provide power to the motor. In an embodiment, intelligent motor 102 samples three phases of voltage, load end and fan end bearing temperatures, winding temperature, and vibration, and receives sampled motor current and voltage from three phases from power management device 115, which may be a VFD. All three phases of voltage and current may be sampled at the same time. Synchronization of the sampling of current and voltage between the two machines may be performed by transferring information between the two machines. The VFD may continuously send sampled, raw motor current data to intelligent motor 102. Alternatively, intelligent motor 102 may issue a request for sampled motor current. In this case, the next sample of motor current would be provided to intelligent motor 102. Motor current information may be scheduled at a particular time in the future in order to synchronize local sensor input performed by intelligent motor 102 and motor current sampling performed by the VFD. The permits correlating sampled motor current data with locally sampled vibration data for example. Alternatively, a schedule may be established to send motor current at regular intervals. At each data transmission the intelligent motor processes the motor current information and determines the motor's operating condition. Motor current sampling may be determined by an established trigger or interrupt. For example, when motor current reaches a critical value or the change in RMS motor current exceeds a pre-defined threshold, the motor current information is sampled and transferred to the intelligent motor for diagnosis. Synchronization may be realized using a number of techniques including, but not limited to, a trigger pulse, a common clock and a common sampling time, and/or a sample command from one device to the other. Firmware or other processing components may be adapted to VFDs to send out the current motor information a communication port of the VFDs.

A motor soft start such as a smart motor controller (SMC) is a motor controller that provides for a controlled startup and shutdown for a motor. A soft start device may control the initial power to a motor. A soft-start device has information that allows it to increase the power to the motor at a predefined rate without immediately applying full power to the motor. For instance, a motor soft-start may slowly bring a motor to full speed such that instead of the motor going full speed in about a half a second, after overcoming the inertia, it may bring the motor up to full speed in 20 seconds, which may reduce the current draw on the overall system. The control rate provided by the motor soft-start device may be set by the operator or installation engineer and depends on the application requirements. A soft-start typically includes a motor current sensor to continuously determine the power to the motor. In an embodiment, a motor soft-start may be adapted to determine and to communicate motor current information to an intelligent motor.

A motor soft-start is a device that monitors the power of a motor to protect the motor. The monitored power provides motor current information that may be used by an intelligent motor. Other means may be used to determine or sample current, power, and/or energy of an operating intelligent motor. These means may be adapted to communicate with an intelligent motor to provide the intelligent motor with motor current information.

Other parameters determined by a power management device, such as torque, torque ripple, speed, inertia, and/or temperature, may also be transmitted to the intelligent motor to provide enhanced diagnostics, prognostics, or control information. Information determined by an intelligent motor may similarly be sent to the external power management device to enhance the control, protection, or loading normally provided by the external power management device. Information determined by an intelligent motor may include data measured, sensed, calculated, or received via a network. For example, computed torque by the intelligent motor using the high accuracy motor model may be sent to the variable speed drive to enhance or enable sensorless torque speed control. Alternatively, computed torque by the variable speed drive such as used for sensorless torque control may be sent to the motor to enhance or enable superior diagnostics and prognostics. Combined operation of an intelligent motor and a power management device may enhance the accuracy, response time, and reduce the cost to determine critical motor and operating parameters. For enhanced process modeling using actual motor design information, a temperature-compensated motor model and a dynamic motor model along with information from the power management device may enhance torque feedback control. Having remote sensors to measure the current, power, and/or energy of an operating intelligent motor and provide information to the intelligent motor may reduce the cost, weight, size, and power requirements of an intelligent motor. A power management device having a communications interface may be integrated by a communication medium with an intelligent motor to predict the health and to optimize the control of the intelligent motor.

Referring to FIG. 1, device 103 may represent a self-contained operating entity that operates and communicates with other elements using an intelligent agent framework. An agent is a logical entity that has local autonomy and may operate in collaboration with other agents. In this case, the agent represented by device 103 contains local software and algorithms to permit this device to operate autonomously and control the motor system 102 to realize local goals and objectives. In addition, this agent can also collaborate with other agents such as other power management device agents to coordinate operation in an effort to respond to system emergencies or to more effectively carry out higher level missions or objectives. In addition, the intelligent motor 102 may similarly operate as an agent and communicate with other intelligent motors and power management devices using an agent infrastructure. Agents may collaborate to achieve more effective and more accurate diagnostics and collaborate and negotiate to achieve more effective and more responsive system-level control. Agents may communicate using any of the well known collaboration protocols (e.g. bidding) and may utilize a standard agent communications protocol (e.g. FIPA— Foundation for Physical Agents).

Figure 2:
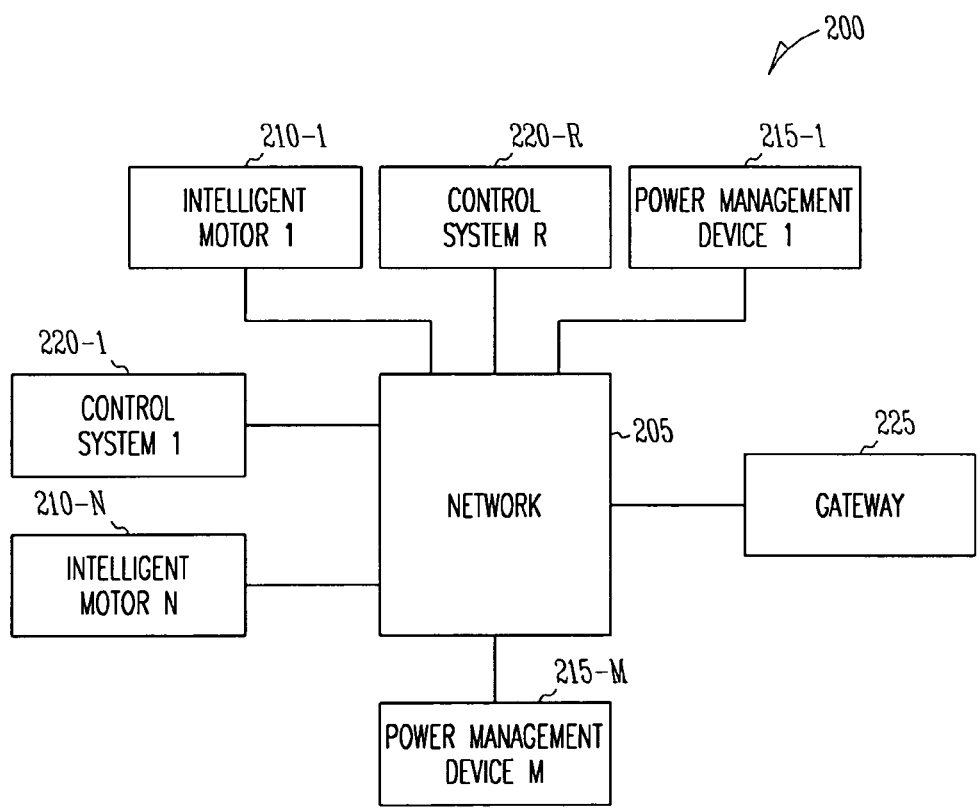
FIG. 2 illustrates a block diagram of an embodiment of an architecture in which a number of intelligent motors and a number of power management devices may be coupled to a network.

FIG. 2 illustrates a block diagram of an embodiment of an architecture 200 in which a number of intelligent motors, 210-1 . . . 210-N, and a number of power management devices, 215-1 . . . 215-M, may be coupled to a network 205. Architecture 200 may include a number or control systems, 220-1 . . . 220-R. Architecture 100 allows for communication and control from systems that are on different networks. Such communication and control may be provided by a gateway 225 that allows plants operating anywhere to share information and control of apparatus even to the level of a motor. Architecture 200 provides an open architecture for central control and diagnostics, distributed control and diagnostics, and/or a combination of distributed and central control and/or diagnostics.

In an embodiment, one power management device operates with one intelligent motor. In an embodiment, one power management device operates with a number of intelligent motors. A variable speed drive may bring one intelligent motor up to speed and then be disconnected from the intelligent motor and switch to another intelligent motor. The variable speed drive may then bring this second intelligent motor up to speed. This configuration for a variable speed drive has been used for the controlled start of multiple pumps with one VFD. In an embodiment, any of intelligent motor 210-1 . . . 210-N may be operated with any of power management devices 215-1 . . . 215-M. Intelligent 210-1 . . . 210-N and power management devices 215-1 . . . 215-M may have communications interfaces configured in a manner similar to that shown in FIG. 1. In an addition, intelligent motor 210-1 . . . 210-N and power management devices 215-1 . . . 215-M may be controlled by one or more control systems 220-1 . . . 220-N. In an embodiment, control systems 220-1 . . . 220-N may be realized as a central control system. In an embodiment, architecture 200 may provide a platform for multimotor/single control distributed diagnostics. Though not shown in FIG. 2, the architecture includes power connections between the motor and the power management device along with power switches or relays.

In an embodiment, a power management device senses three phases of motor current and three phases of voltage and performs its own core function such as maintaining intelligent motor speed in spite of load changes. The same power management device connected to its associated intelligent motor may send raw data to that intelligent motor. The intelligent motor receives the three phases of raw current and voltage data and performs filtering and signal processing on the raw data followed by a series of diagnostics tasks such as diagnosing the health of motor components. For example, the intelligent motor may determine the condition of the windings, the bearings, the rotor, out of balance condition, torque, or the health of a pump connected to the motor. The intelligent motor may locally display that data on an LED and/or it could send the machinery health information back through network 205 to a control system, such as a monitoring or a maintenance management system. The health information may include a request that the intelligent motor be scheduled for a maintenance activity. For example, the intelligent motor may request a maintenance activity at the end of the next operational shift because a bearing in the intelligent motor is starting to overheat, or the motor windings are running hot. The intelligent motor may apply its motor model to predict a motor failure, such as a winding failure, that may occur in the near future.

Alternatively, an intelligent motor may collect data from a motor accelerometer, motor temperature sensors, and/or other embedded sensors, perform a limited about of processing of the collected data, and then send the data and/or processing results back to the power management device, where the power management device may conduct some additional processing. The power management device may have operational information regarding its associated intelligent motor, such as the switching characteristics of the power devices. If the intelligent motor determined, for example, that the motor windings are starting to fail, it may send this data back to the power management device. With this information, the power management device, for instance a motor controller, may change the manner in which it controls the motor. For instance, the power management device may change the speed at which the intelligent motor is running. It may also prescribe a change in the control algorithm to reduce the controller gains thereby causing the motor to operate slightly more sluggishly for example to meet processing requirements while reducing the electrical and mechanical stress on the motor and connected components. It may also prescribe the VFD to change the carrier frequency used to control the motor speed. This may change the power requirements for the motor and perhaps cause a less efficient or noisier operation. However, the process may continue to operate while causing significantly less stress and heating on critical motor components.

Alternatively, the intelligent motor may determine the manner in which it is operating and send a message to the power management device requesting a change, permission to make a change, or notice that it is making a change. The amount of control allowed to the intellectual motor may depend on the application and its power supply configuration. The power management device may perform some additional enhanced diagnostics and provide the information to the intelligent motor diagnostics. By sharing information between the power management device and the intelligent motor, motor control may be dynamically changed. Instead of sending the information back to its associated power management device, the intelligent motor may send the raw data and/or limited processed data to a control system for further processing. Various embodiments include a number of permutations in which information may be transferred between intelligent motors and power management devices and/or control systems to provide an integrated approach to managing the intelligent motors to allow enhanced performance of the intelligent motors.

Architecture 200 may be implemented in an open architecture in which network 205 may be realized by a number of different embodiments depending on the application. Network 205 may provide real-time motor current information to intelligent motors 210-1 . . . 210-N. Network 205 may be a wired network. Intelligent motors 210-1 . . . 210-N and power management devices 215-1 and 215-M may connect to network 205 via an RS232 interface. Network 205 may operate as an Ethernet network. Network 205 may operate as a wireless network. Network 205 may include a fiber optic network. Network 205 may provide point-to-point communication between an intelligent motor and its associated power management device or point-to-point communication between an intelligent motor and its associated control system. Network 205 may be a local area network or a wide area network. Network 205 may provide communication between the various components of architecture 200 using power line communication. Communications interfaces similar to those discussed with respect to FIG. 1 for intelligent motors 210-1 . . . 210-N and power management devices may be configured to operate with various embodiments of network 205. Network 205 is not limited to the embodiments enumerated herein. Network 205 provides a means for exchanging information between intelligent motors 210-1 . . . 210-N and power management devices 215-1 and 215-M and/or control systems 220-1 . . . 220-N that provides for integrated control and operation for enhanced performance of intelligent motors 210-1 . . . 210-N. As noted previously, the architecture provides a foundation for intelligent motors and/or power management devices to operate and collaborate as intelligent agents. The infrastructure of intelligent agents permits distributed control and diagnostics as described previously and provides a foundation for a more efficient, more accurate control and diagnostic process. Inter-agent communication across the network 205 may employ FIPA to enhance system-wide operation and optimization.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments, and other embodiments, will be apparent to those of skill in the art upon studying the above description.

What is claimed is:
1. An apparatus including:
   a communications interface configured relative to a motor and a power management device, the communications interface to operatively transfer information between the motor and the power management device, the power management device being separate from the motor, the power management device configured to remotely sense motor current of the motor and to generate a first information including motor current information of the motor from the sensed motor current, and the power management device configured to transfer the first information to the motor, the motor having an embedded processor configured to provide diagnostics and/or prognostics of the motor using the transferred motor current information in the first information, the first information including the motor current information operatively transferred through the communications interface from the power management device to the motor, the motor current information being different from a control signal to the motor.
2. The apparatus of claim 1, wherein the first information includes information to provide diagnostics and/or prognostics of machinery arranged to operate with the motor.

3. The apparatus of claim 1, wherein the first information includes information to provide diagnostics and/or prognostics of a process in which the motor is arranged to operate.

4. The apparatus of claim 1, wherein the apparatus includes data compression algorithms and/or data expansion algorithms to transfer the information.

5. The apparatus of claim 1, wherein the first information includes sampled information and/or computed information generated at the power management device.

6. The apparatus of claim 5, where the sampled information and/or computed information includes sampled and/or computed information converted to wavelet coefficients, the motor to reconstruct an original signal using the wavelet coefficients transferred.

7. The apparatus of claim 1, wherein the first information includes essentially motor current information.

8. The apparatus of claim 1, wherein the first information includes raw motor current data.

9. The apparatus of claim 1, wherein the first information includes motor current information generated using one or more signal processing techniques.

10. The apparatus of claim 9, wherein the one or more signal processing techniques includes one or more signal processing techniques selected from a group consisting of filtering, smoothing, translation to frequency domain, conversion to wavelet coefficients, and curve fitting.

11. The apparatus of claim 1, wherein the first information includes an analysis of motor current of the motor.

12. The apparatus of claim 1, wherein the communications interface includes a communications interface compatible with RS-232.

13. The apparatus of claim 1, wherein the communications interface includes a communications interface compatible with one or more communication standards selected from a group of DeviceNet, ControlNet, AS-I, Intellibus, IEEE 802.15.4, IEEE 802.11b, and Zigbee.

14. The apparatus of claim 1, wherein the communications interface includes a communications interface compatible with an Ethernet network.

15. An apparatus comprising:
a motor having an embedded processor configured to provide diagnostics and/or prognostics of the motor using determined motor current information of the motor included in information operatively received from a power management device, the motor current information generated by the power management device from sensing motor current of the motor by the power management device, the motor current information being different from a control signal to the motor; and
a communications interface coupled to the motor, the communications interface to receive the information from the power management device, the power management device being separate from the motor and the communications interface, the motor operable to process the information, received through the communications interface from the power management device, to provide the diagnostics and/or the prognostics using the motor current information, the information including the determined motor current information of the motor remotely generated from sensing by the power management device.

16. The apparatus of claim 15, wherein the information includes information to provide diagnostics and/or prognostics of machinery arranged to operate with the motor, the diagnostics and/or prognostics provided using the embedded processor.

17. The apparatus of claim 15, wherein the information includes information to provide diagnostics and/or prognostics of a process in which the motor is arranged to operate, the diagnostics and/or prognostics provided using the embedded processor.

18. The apparatus of claim 15, wherein the information includes raw motor current data and/or an analysis of motor current of the motor.

19. The apparatus of claim 15, wherein the processor is configured to analyze motor data and provide an analysis to the power management device.

20. The apparatus of claim 15, wherein the apparatus includes memory to store the information.

21. The apparatus of claim 15, wherein the apparatus includes a sensor to sample a voltage phase of the motor, sampling of the voltage phase synchronized with the information from the power management device.

22. The apparatus of claim 15, wherein the communications interface is configured to couple to a local area network.

23. The apparatus of claim 15, wherein the communications interface has a connection to couple to the power management device in a point-to-point configuration.

24. An apparatus comprising:
a power management device to generate information and to transmit the information to a motor, the information correlated to operation of the motor, the information including motor current information of the motor, the power management device being separate from the motor, the power management device configured to remotely sense motor current of the motor and generate the motor current information from the sensed motor current as at least part of the information to transfer to the motor, the motor having an embedded processor to provide diagnostics and/or prognostics of the motor using the generated motor current information in the information, the motor current information being different from a control signal to the motor; and
a communications interface configured relative to the power management device and the motor, the communications interface coupled to the power management interface to transmit the information from the power management device to the motor.

25. The apparatus of claim 24, wherein the power management device includes a sensor to remotely determine motor current information of the motor.

26. The apparatus of claim 24, wherein the power management device includes a variable speed drive.

27. The apparatus of claim 24, wherein the power management device includes a variable frequency drive.

28. The apparatus of claim 24, wherein the power management device includes a smart motor controller.

29. The apparatus of claim 24, wherein the power management device includes a smart motor protector.

30. The apparatus of claim 24, wherein the power management device includes one or more power devices selected from a group of a power monitoring device, a power recording device, or a current data acquisition module.

31. The apparatus of claim 24, wherein the communications interface is configured to receive motor status information from the motor.

32. The apparatus of claim 31, wherein the power management device is adapted to adjust parameters of the power management device based on the motor status information.

33. The apparatus of claim 24, wherein the communications interface is configured to couple to a local area network.

34. The apparatus of claim 24, wherein the communications interface has a connection to couple to the motor in a point-to-point configuration.

35. A system comprising:
a motor having an embedded processor to provide diagnostics and/or prognostics of the motor and having a first communications interface to receive information including motor current information of the motor, the motor to process the information, including the motor current information of the motor, to provide the diagnostics and/or the prognostics using the motor current information, the motor current information being different from a control signal to the motor; and
a power management device having a second communications interface to transmit the information to the motor, the power management device being separate from the motor, the information including the motor current information of the motor, the power management device configured to remotely sense motor current of the motor and to generate the motor current information from the sensed motor current.

36. The system of claim 35, wherein the system includes data compression algorithms and/or data expansion algorithms to transfer the information.

37. The system of claim 35, wherein the information includes sampled information and/or computed information generated at the power management device.

38. The system of claim 37, where the sampled information and/or computed information includes sampled and/or computed information converted to wavelet coefficients, the motor to reconstruct an original signal using the wavelet coefficients transferred.

39. The system of claim 35, the processor is configured to self-diagnose the motor using the information.

40. The system of claim 35, wherein the power management device includes a sensor to remotely determine motor current information of the motor.

41. The system of claim 35, wherein the motor and the power management device act as autonomous agents in collaboration with each other.

42. The system of claim 35, wherein the motor is adapted to transmit motor status information to the power management device.

43. The system of claim 35, wherein the first communications interface and the second communications interface are adapted to couple to local area network.

44. The system of claim 35, wherein the first communications interface and the second communications interface are configured to wirelessly transfer data between each other.

45. The system of claim 35, wherein the power management device is selected from a group consisting of a variable speed drive, a variable frequency drive, a smart motor controller, and a smart motor protector.

46. The system of claim 35, wherein the system includes a plurality of power management devices.

47. A method comprising:
remotely sensing motor current of a motor by a power management device and generating motor current information from the sensed motor current, the power management device separate and remote from the motor, the motor having an embedded processor to provide diagnostics and/or prognostics of the motor using the motor current information generated by the power management device from the sensed motor current; and
transferring information between the power management device and the motor including operatively transmitting the motor current information of the motor to the motor from the power management device, the motor current information provided for processing by the embedded processor using the motor current information, the motor current information being different from a control signal to the motor.

48. The method of claim 47, wherein transferring information includes transferring information to provide diagnostics and/or prognostics of machinery arranged to operate with the motor, the diagnostics and/or prognostics provided using the embedded processor.

49. The method of claim 47, wherein transferring information includes transferring information to provide diagnostics and/or prognostics of a process in which the motor is arranged to operate, the diagnostics and/or prognostics provided using the embedded processor.

50. The method of claim 47, wherein the method includes using a current sensor of the power management device to remotely determine the motor current information including one or more phases of the motor current.

51. The method of claim 47, wherein the method includes the power management and the motor acting as autonomous agents in collaboration with each other.

52. The method of claim 47, wherein transferring information includes transferring information over a local area network.

53. The method of claim 52, wherein transferring information includes wirelessly transferring the information.

54. The method of claim 53, wherein wirelessly transferring the information includes transferring information over a wireless network.

55. A method comprising:
remotely sensing motor current of a motor by a power management device, the power management device being separate from the motor;
generating motor current information by the power management device from the sensed motor current; and
transmitting, from the power management device to the motor, results from sensing the motor current of the motor, the results including the generated motor current information, the motor having an embedded processor to provide diagnostics and/or prognostics of the motor using the motor current information of the results, the motor current information being different from a control signal to the motor.

56. The method of claim 55, wherein remotely determining motor current of a motor includes measuring the motor current using one or more power management devices from a group consisting of a variable speed drive, a variable frequency drive, a smart motor controller, and a smart motor protector.

57. The method of claim 55, wherein the method includes receiving, in the power management device or in a control system, motor status information from the motor.

58. The method of claim 57, wherein the method includes adjusting parameters in the power management device or in the control system based on the motor status information.

59. A method comprising:
receiving information at a motor from a separate power management device, the separate power management device being separate from the motor, the information generated by the separate power management device and associated with motor current of the motor, the motor current sensed remotely from the motor at the separate power management device, the information including motor current information generated by the separate power management device from the sensed motor current, the motor having an embedded processor;

applying the information at the motor to provide diagnostics and/or prognostics of the motor using the embedded processor and using the generated motor current information of the motor, the motor current information being different from a control signal to the motor; and
storing data from the diagnostics and/or prognostics in a memory.

60. The method of claim 59, wherein the method includes analyzing apparatus associated with the motor.

61. The method of claim 60, wherein the method includes providing the analysis to the separate power management device or another power management device.

62. The method of claim 59, wherein the method includes providing motor status to the separate power management device or another power management device.

63. The method of claim 59, wherein the method includes storing the information in a memory of the motor.

64. The method of claim 59, wherein receiving information at a motor from a separate power management device includes receiving the information from a separate power management device having a sensor to remotely measure the motor current.

65. The method of claim 64, wherein receiving the information from a separate power management device includes receiving information from one or more power management devices from a group consisting of a variable speed drive, a variable frequency drive, a smart motor controller, and a smart motor protector.

66. The method of claim 59, wherein receiving information at a motor from a separate power management device includes receiving the information from a central control system.

* * * * *